(12) United States Patent
Kitagawa

(10) Patent No.: US 7,136,538 B2
(45) Date of Patent: Nov. 14, 2006

(54) NOISE REDUCING APPARATUS AND NOISE REDUCING METHOD

(75) Inventor: Masao Kitagawa, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 511 days.

(21) Appl. No.: 10/021,039

(22) Filed: Dec. 19, 2001

(65) Prior Publication Data
US 2002/0080882 A1  Jun. 27, 2002

(30) Foreign Application Priority Data
Dec. 21, 2000  (JP) .............................. 2000-388308

(51) Int. Cl.
*G06K 9/40* (2006.01)

(52) U.S. Cl. .................. 382/275; 382/236; 382/298

(58) Field of Classification Search ........ 382/260–265, 382/298, 236, 275; 345/660; 348/241, 451, 348/452, 700, 701
See application file for complete search history.

(56) References Cited

U.S. PATENT DOCUMENTS

| | | | | |
|---|---|---|---|---|
| 5,424,783 A | * | 6/1995 | Wong .......................... | 348/606 |
| 5,570,135 A | * | 10/1996 | Gove et al. .................. | 348/581 |
| 5,610,729 A | | 3/1997 | Nakajima | |
| 5,757,976 A | | 5/1998 | Shu | |
| 5,790,714 A | * | 8/1998 | McNeil et al. ............... | 382/300 |
| 5,819,035 A | | 10/1998 | Devaney et al. | |
| 5,850,294 A | | 12/1998 | Apostolopoulos et al. | |
| 5,852,475 A | | 12/1998 | Gupta et al. | |
| 5,877,813 A | | 3/1999 | Lee et al. | |
| 5,920,356 A | | 7/1999 | Gupta et al. | |
| 5,973,740 A | | 10/1999 | Hrusecky | |
| 6,066,980 A | * | 5/2000 | Daribi ......................... | 327/552 |
| 6,083,168 A | * | 7/2000 | Hossack et al. ............. | 600/443 |
| 6,178,205 B1 | * | 1/2001 | Cheung et al. ........ | 375/240.29 |
| 6,348,929 B1 | * | 2/2002 | Acharya et al. ............ | 345/660 |

FOREIGN PATENT DOCUMENTS

| | | |
|---|---|---|
| EP | 0 592 196 A2 | 4/1994 |
| JP | 55-179466 A | 6/1954 |
| JP | 64-55987 | 3/1989 |
| JP | 4-68965 | 3/1992 |

(Continued)

OTHER PUBLICATIONS

IEEE document entitled "Space-Scale Adaptive Noise Reduction in Images Based on Thresholding Neural Network" by Xiao-Ping Zhang; Departemnt of Electrical and Comnputer Engineering Ryerson Polytechnic University.*

*Primary Examiner*—Bhavesh M. Mehta
*Assistant Examiner*—Wes Tucker
(74) *Attorney, Agent, or Firm*—McDermott Will & Emery LLP

(57) ABSTRACT

In order to reduce noise appropriately according to scaling factor and a degree of motion of an image and to suppress degradation in image quality resulting from the noise reduction to a negligible level, a noise reduction control section outputs a noise detection instruction, a noise detection threshold instruction and a filtering mode instruction based on a scale factor output from a scale factor calculating section and a motion detection result output from a motion detecting section. A mosquito noise reducing section and a blocking artifact reducing section in a noise reducing section adaptively conducts an appropriate noise reducing process using noise detection sensitivity and the number of filter taps and a filter coefficient of a smoothing filter according to these instructions.

4 Claims, 7 Drawing Sheets

FOREIGN PATENT DOCUMENTS

| | | |
|---|---|---|
| JP | 5-75901 | 3/1993 |
| JP | 5-83697 | 4/1993 |
| JP | 5-183875 | 7/1993 |
| JP | 6-233266 | 8/1994 |
| JP | 7-15662 | 1/1995 |
| JP | 7-225833 | 8/1995 |
| JP | 7-307942 | 11/1995 |
| JP | 9-130794 | 5/1997 |
| JP | 9-139887 | 5/1997 |
| JP | 9-163225 | 6/1997 |
| JP | 10-13718 | 1/1998 |
| JP | 10-56583 | 2/1998 |
| JP | 11-341309 | 12/1999 |
| WO | WO 98/41011 | 9/1998 |

\* cited by examiner

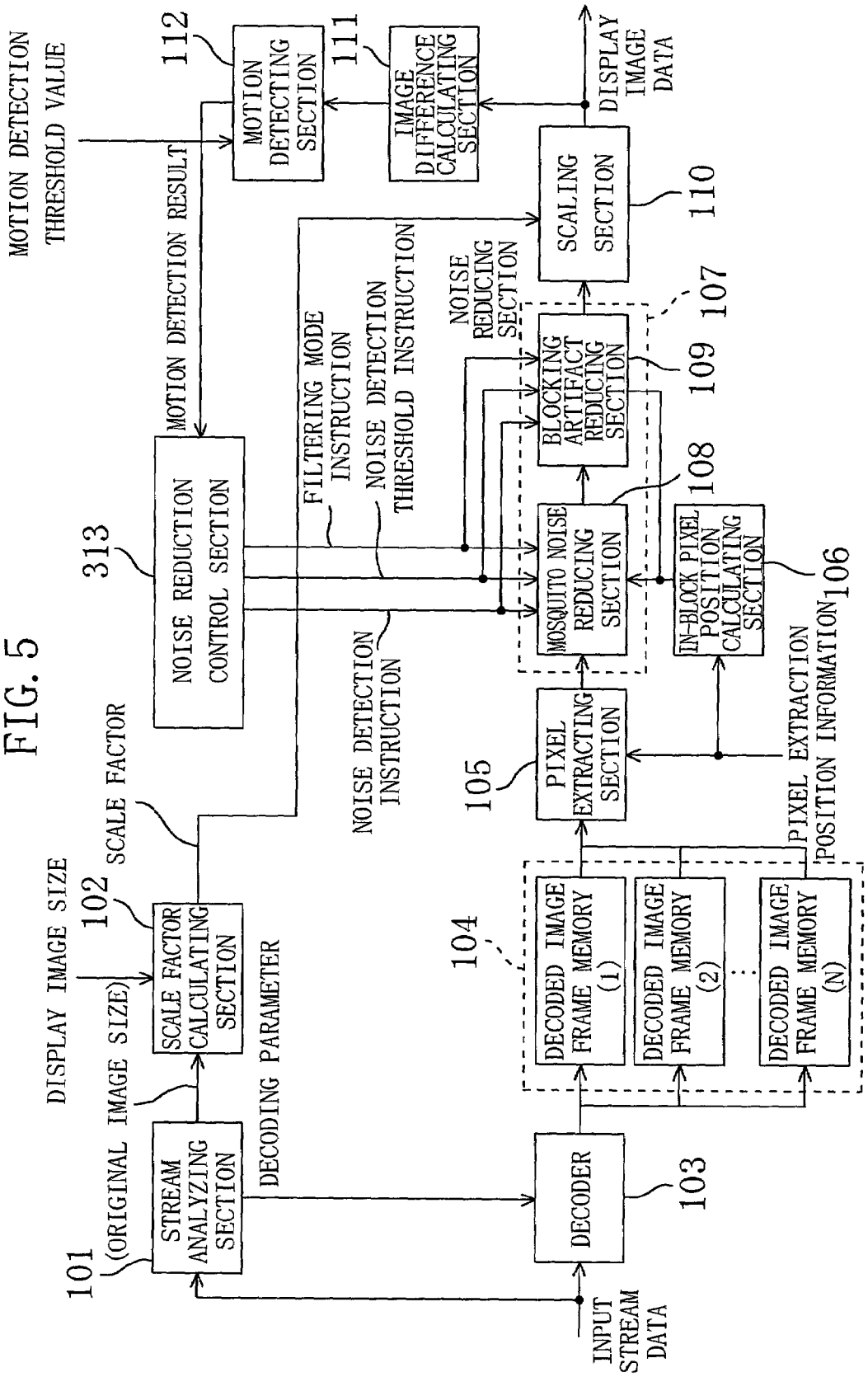

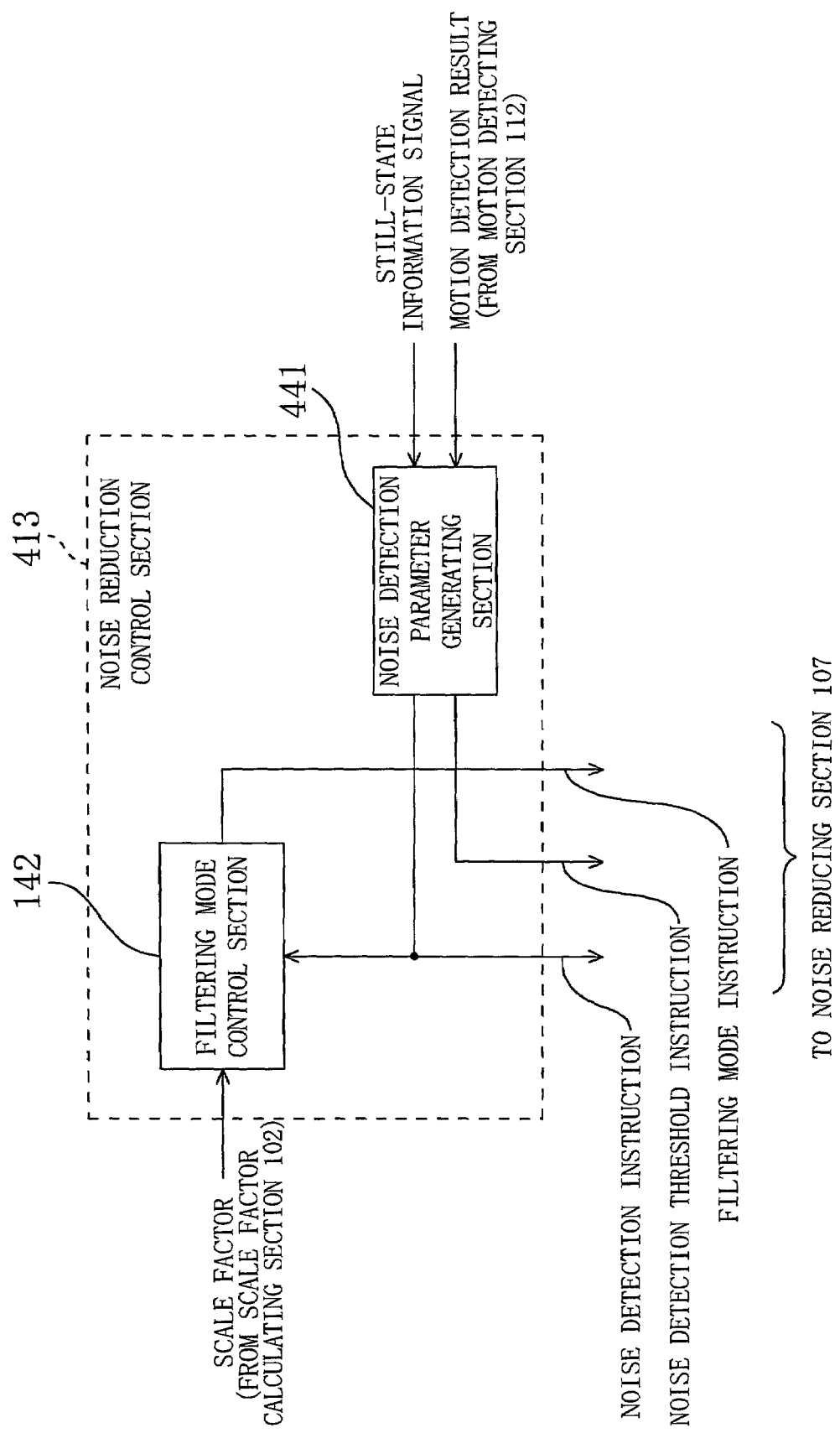

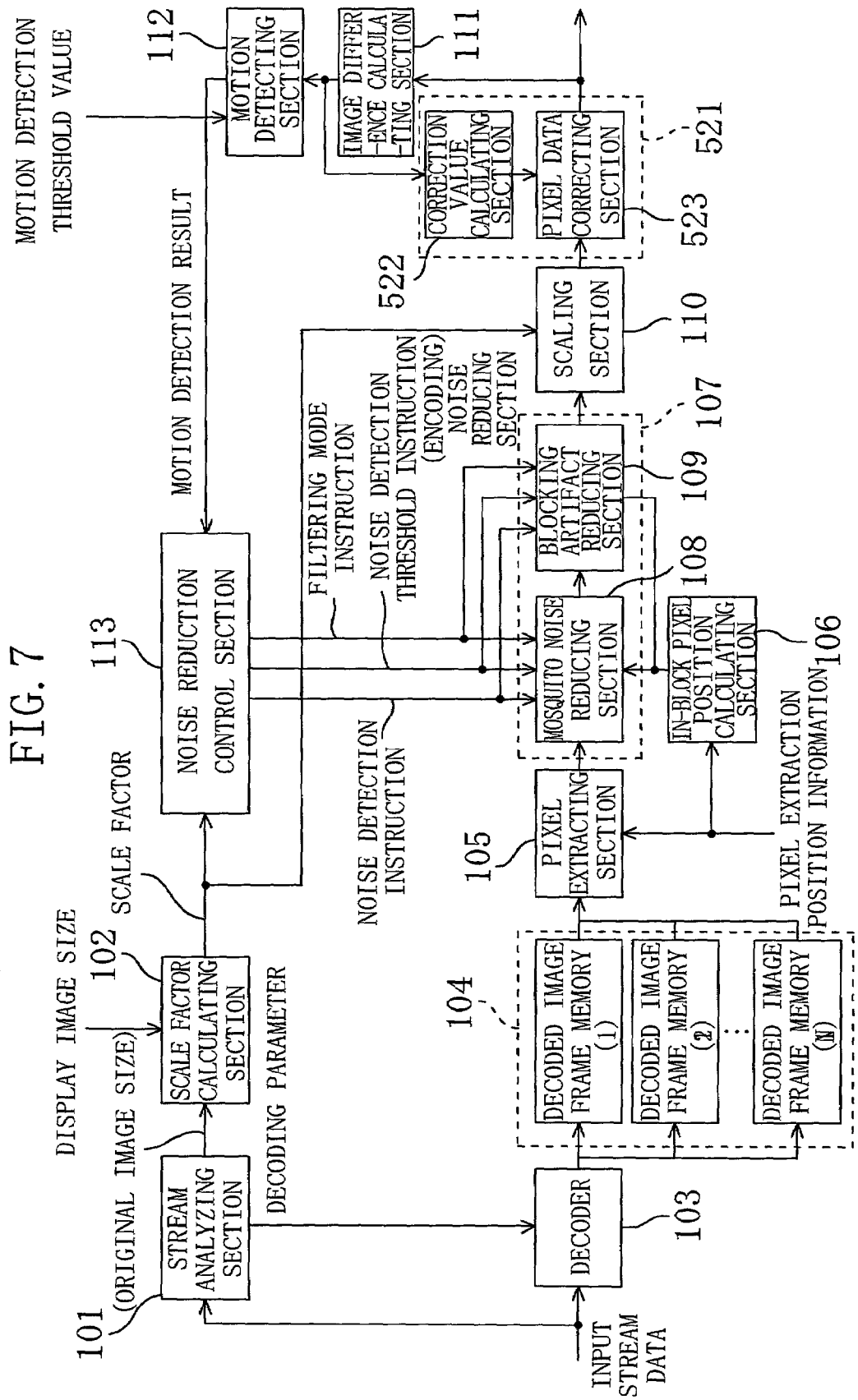

NOISE REDUCING APPARATUS AND NOISE REDUCING METHOD

BACKGROUND OF THE INVENTION

1. Field of the Invention

The present invention generally relates to a noise reducing apparatus for reducing a noise component included in a digital video signal. More particularly, the present invention relates to reduction of a noise component included in a digital video signal obtained by compressively encoding image data on a block-by-block basis by an encoder and then decoding the resultant image data by a decoder.

2. Description of the Related Art

A digital video signal resulting from decoding of image data by a decoder includes random noise and encoding noise which is introduced in encoding process. The random noise results from degraded quality of a material image itself to be encoded by an encoder. The encoding noise is generated by, e.g., quantization error caused upon encoding. The encoding noise is thus specific to an encoding/decoding system.

Specific examples of the encoding noise include mosquito noise and blocking artifact. For example, the mosquito noise is generated in a flat region near the edge of the image within a 8×8 pixel encoding block. The blocking artifact appears as distortion at the boundary of an encoding block. These noises are generally reduced or reduced by a smoothing process. Since the noise reducing process is a process that damages the original image in a sense, it involves degradation in image quality more or less. Therefore, the noise reduction level in the noise reducing process is generally determined so as to balance the noise reducing effect with the influence of degradation in image quality.

With recent diversification of image information and display devices, the original image data is increasingly scaled for display rather than being displayed in its original size. For example, the display image size on a display device may vary depending on the areas (e.g., the European countries and the US). Even in the same area, the display image size (aspect ratio) may vary like 4:3 and 16:9 depending on the display devices. Some display devices are capable of scaling the displayed image through operation of the user. Moreover, devices capable of recording and reproducing the image of various sizes such as a DVD player/recorder are becoming widespread. Such an image scaling process is conducted by performing a prescribed operation (a kind of filtering process) on the pixel data of each pixel and its neighboring pixels.

Conventionally, however, since the noise reducing process and the scaling process are independent processes having completely different purposes from each other, the balance between the respective influences of the processes has not been considered particularly. This may result in failing to obtain a sufficient noise reducing effect or may result in degraded image quality (other than noise) when the image data is subjected to such a noise reducing process and scaling process. In other words, even if the noise reducing process is conducted so as to balance the noise reducing effect with the influence of degradation in image quality as described above, the balance is not necessarily retained even after the scaling process. For example, if a smoothing process for noise reduction results in less sharp edges, the edges of the image may get much less sharp as a result of the enlarging process. On the contrary, even if the noise reduction level is increased, the subsequent scaling process (a kind of filtering process) may degrade the image quality rather than improving it.

Similar problems regarding the balance between the noise reducing effect and the influence of degradation in image quality are also caused by the difference in magnitude of the motion in the image. More specifically, the conventional noise reducing apparatus has a fixed, preset noise reduction level. Therefore, if the noise reduction level is set so that noise is sufficiently reduced from a fast-moving image (i.e., an image that reduces human eye's visual sensitivity to degradation in image quality), degradation in image quality is more likely to be perceived in a slow-moving image (i.e., an image that increases the human eye's visual sensitivity thereto) than the noise reducing effect. On the other hand, if the noise reduction level is set so that the slow-moving image is not noticeably degraded in quality, the noise reducing effect on the fast-moving image is not likely to be perceived.

SUMMARY OF THE INVENTION

In view of the foregoing problems, it is an object of the present invention to provide a noise reducing apparatus and a noise reducing method capable of appropriately reducing noise even from an image scaled by various factors and a fast-moving or slow-moving image, and also capable of suppressing degradation in image quality resulting from noise reduction to a negligible level.

In order to achieve the above object, according to a first aspect of the present invention, a noise reducing apparatus includes: at least one noise reducing section for reducing encoding noise of image data with controllable noise reduction characteristics; and a control section for controlling the noise reduction characteristics of the noise reducing section according to at least one of a scale factor for scaling an image represented by the image data and a degree of motion of the image.

In the first aspect of the present invention, the noise reducing section reduces encoding noise with the noise reduction characteristics that are controlled by the control section according to the scale factor and/or the degree of motion of the image. Therefore, noise can be reduced from the image while preventing degradation in image quality resulting from the noise reduction to a negligible level even when the image is enlarged. Moreover, noise can be sufficiently reduced from a fast-moving image, and also noise can be reduced from a slow-moving image while suppressing degradation in image quality resulting from the noise reduction to a negligible level.

Preferably, the noise reducing section includes at least one of a mosquito noise reducing section for reducing mosquito noise and a blocking artifact reducing section for reducing blocking artifact.

According to this noise reducing apparatus, the mosquito noise and/or the blocking artifact are reduced with appropriate noise reduction characteristics as described above, enabling high-quality image display.

Preferably, the control section controls the noise reduction characteristics by controlling at least one of noise detection sensitivity and a noise reduction level of the noise reducing section.

Specifically, the noise reducing section may include a filter, and the control section may control the noise reduction level by controlling at least one of the number of filter taps and a filter coefficient of the filter.

More specifically, the control section may control the number of filter taps and the filter coefficient so that the noise reduction level is lower when the scale factor is greater than 1 than when the scale factor is 1.

The control section may control the number of filter taps and the filter coefficient so that the noise reduction level is higher when the degree of motion of the image is larger than a prescribed value than when the degree of motion of the image is smaller than the prescribed value.

The control section may control the number of filter taps and the filter coefficient so that input image data to the noise reducing section is the same as output image data from the noise reducing section when noise reduction is not conducted.

With this noise reducing apparatus, the noise reduction characteristics can be readily controlled according to the scale factor and/or the degree of motion of the image.

Preferably, the noise reducing apparatus further includes: an extracting section for extracting image data of a prescribed region from original image data (or trimming the original image data) to produce effective display image data; and a scaling section for scaling the image data extracted by the extracting section by a prescribed scale factor.

According to this noise reducing apparatus, a part of original image can be scaled by the prescribed factor with high image quality.

Preferably, the noise reducing apparatus further includes: an original image size detecting section for detecting an original image size from original image data; and a scale factor calculating section for calculating a scale factor of the image from the detected original image size and a display image size. The control section preferably controls the noise reduction characteristics of the noise reducing section according to the scale factor calculated by the scale factor calculating section.

According to this noise reducing apparatus, high-quality image can be readily displayed with an appropriate display size.

Preferably, the noise reducing apparatus further includes a motion detecting section for obtaining the degree of motion of the image based on a sum of absolute values of differences between pixel data of the same position in at least one pair of successive field images or frame images, and the difference is obtained for pixels in at least a part of each field image or each frame image. The control section preferably controls the noise reduction characteristics of the noise reducing section according to output of the motion detecting section.

Specifically, the motion detecting section may determine a level of the degree of motion of the image from a plurality of levels based on a compared result of the sum with at least one prescribed threshold value, and the control section may control the noise reduction characteristics of the noise reducing section in a plurality of levels according to the level of the degree of motion of the image.

The motion detecting section may obtain the degree of motion of the image based on a plurality of sums respectively obtained for a plurality of image pairs.

Specifically, the motion detecting section may obtain the degree of motion of the image based on a compared result of each of the sums with at least one prescribed threshold value.

According to this noise reducing apparatus, the noise reduction characteristics are controlled according to the degree of motion of the image considering human eye's visual characteristics for a fast-moving image and a slow-moving image. This enables high-quality image display.

Preferably, the control section controls the noise reduction characteristics of the noise reducing section regardless of output of the motion detecting section, in response to a still-state signal indicating a still state in which image data held in an image memory is repeatedly read for display.

According to this noise reducing apparatus, noise can be appropriately reduced from a still image independently of a slow-moving image.

Preferably, the noise reducing apparatus further includes: a random noise reducing section for reducing random noise of the image data based on a difference between pixel data of pixels of the same position in at least one pair of successive field images or frame images; and a difference calculating section shared for calculating the difference between pixel data for reducing the random noise by the random noise reducing section and for calculating the difference between pixel data for obtaining the degree of motion of the image by the motion detecting section.

According to this noise reducing apparatus, not only encoding noise can be appropriately reduced according to the degree of motion of the image, but also random noise can be reduced without causing significant increase in circuit scale.

Preferably, the control section controls the noise reduction characteristics of the noise reducing section according to both the scale factor for scaling an image represented by the image data and the degree of motion of the image.

According to this noise reducing apparatus, noise is appropriately reduced even when an image is displayed with a combination of various scale factors and various degrees of motion of the image. This enables high-quality image display.

Preferably, the control section controls the noise reduction characteristics by controlling a noise reduction level of the noise reducing section according to the scale factor and controlling noise detection sensitivity of the noise reducing section according to the degree of motion of the image.

According to this noise reducing apparatus, both appropriate noise reduction characteristics according to the scale factor and appropriate noise reduction characteristics according to the degree of motion can be easily implemented.

According to a second aspect of the present invention, a noise reducing method includes: at least one step of reducing encoding noise of image data with controlled noise reduction characteristics; and a step of controlling the noise reduction characteristics according to at least one of a scale factor for scaling an image represented by the image data and a degree of motion of the image.

In the second aspect of the present invention, encoding noise is reduced with the noise reduction characteristics according to the scale factor and/or the degree of motion of the image, enabling high-quality image display.

BRIEF DESCRIPTION OF THE DRAWINGS

FIG. 5 is a block diagram showing the structure of another noise reducing apparatus according to the second embodiment;

FIG. 6 is a block diagram specifically showing the structure of a noise reduction control section 413 according to a third embodiment of the present invention; and FIG. 7 is a block diagram showing the structure of a noise reducing apparatus according to a fourth embodiment of the present invention.

DESCRIPTION OF THE PREFERRED EMBODIMENTS

Hereinafter, embodiments of the present invention will be described in conjunction with the accompanying drawings.

First Embodiment

Figure 1:
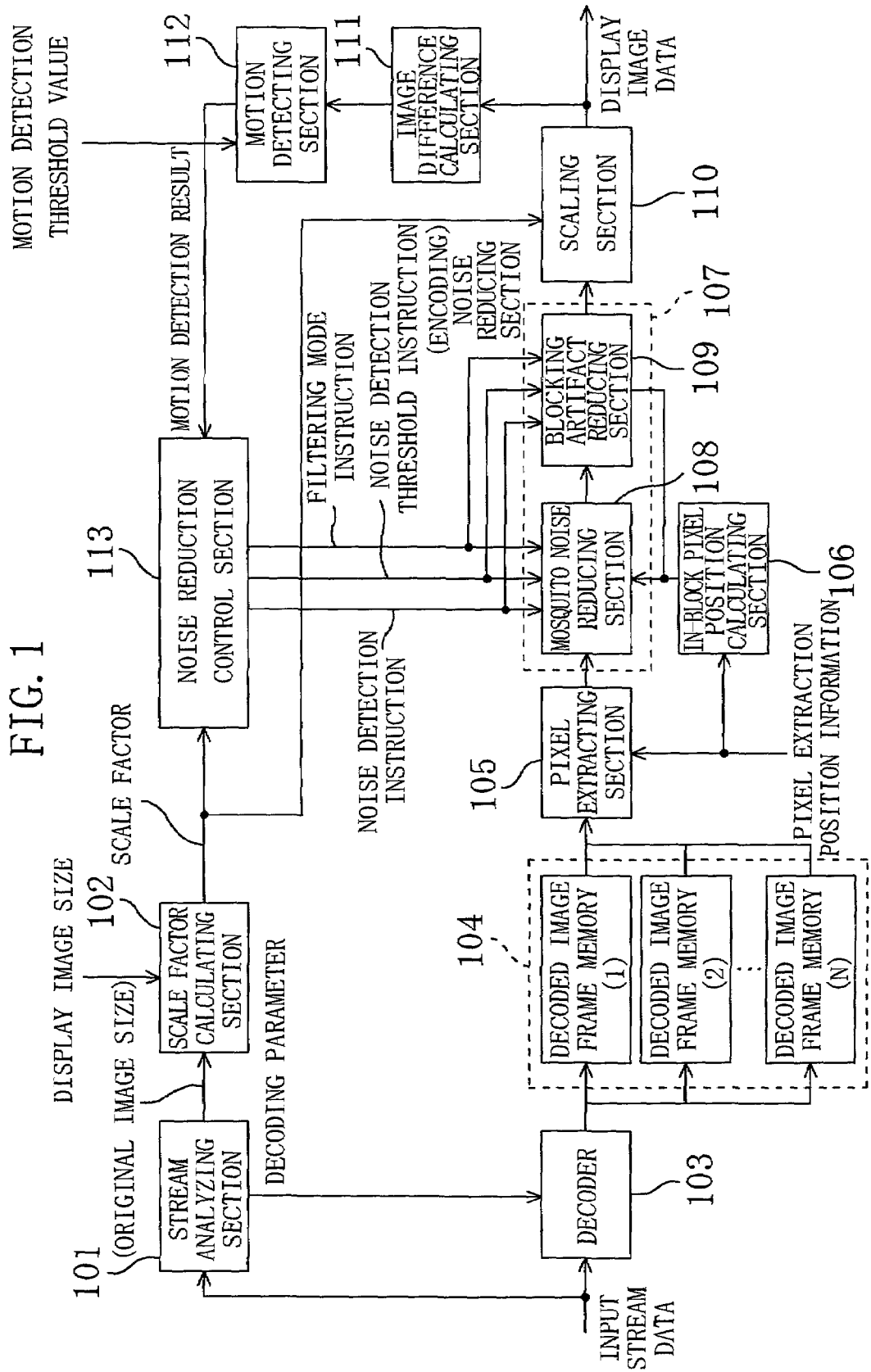
FIG. 1 is a block diagram showing the structure of a noise reducing apparatus according to a first embodiment of the present invention.

FIG. 1 is a block diagram showing the structure of a noise reducing apparatus according to the first embodiment of the present invention. In FIG. 1, a stream analyzing section 101 analyzes input stream data (i.e., encoded image data), and outputs a decoding parameter required for decoding. Based on the stream data, the stream analyzing section 101 obtains image size (original image size) for output.

A scale factor calculating section 102 calculates a scale factor of the image based on the original image size received from the stream analyzing section 101 and the actual display image size. The display image size may either be preset according to, e.g., a display device, or may be specified by operation of the user.

A decoder 103 decodes the input stream data based on the decoding parameter obtained by the stream analyzing section 101, and outputs the decoded image data.

A frame memory 104 (image memory) is a decoded image frame memory for holding N frames of the image data output from the decoder 103 (where N is a natural number).

An image extracting section 105 extracts, based on pixel extraction position information, image data of the pixels in an actual display region from the original image data read from the frame memory 104, and outputs the extracted image data as effective display image data. For example, when the original image has a size of 16:9, the display image having a size of 4:3 can be obtained by extracting only the horizontal central portion of the image.

An in-block pixel position calculating section 106 specifies an encoding block to which each pixel in the image to be extracted by the image extracting section 105 belongs, and calculates a position of that pixel in the encoding block. Such calculation is required because encoding noise is generated on an encoding block-by-encoding block basis or at the boundary of an encoding block (and therefore the noise reducing process must be conducted on an encoding block-by-encoding block basis) but the image extracting section 105 does not necessarily extract the image data on an encoding block-by-encoding block basis (i.e., an extraction position does not necessarily match the boundary of an encoding block).

A noise reducing section 107 includes a mosquito noise reducing section 108 and a blocking artifact reducing section 109 for reducing mosquito noise and blocking artifact, respectively. The noise reduction characteristics of the noise reducing section 107 are controlled with an instruction to conduct noise detection (hereinafter, referred to as noise detection instruction), an instruction indicating a noise detection threshold value (hereinafter, referred to as noise detection threshold instruction) and an instruction indicating a filtering mode (hereinafter, referred to as filtering mode instruction), as described in detail below.

A scaling section 110 scales the image data having encoding noise reduced therefrom according to a scale factor calculated by the scale factor calculating section 102, and outputs display image data. The scaling process herein includes scaling by the factor of 1. The scaling ratio may be varied between the vertical and horizontal directions of the image, or may be varied depending on the regions.

An image difference calculating section 111 calculates the difference between successive image data that are output from the scaling section 110, that is, between image data of successive fields or frames, on a pixel-by-pixel basis. In other words, the image difference calculating section 111 calculates the difference between pixels of the same position in successive image data.

A motion detecting section 112 detects the degree of motion of the image based on the difference obtained in the image difference calculating section 111, and outputs the motion detection result.

A noise reduction control section 113 controls noise reduction characteristics of the noise reducing section 107 by outputting the noise detection instruction, noise detection threshold instruction and filtering mode instruction based on the scale factor received from the scale factor calculating section 102 and the motion detection result received from the motion detecting section 112.

Hereinafter, the image difference calculating section 111, the motion detecting section 112 and the noise reduction control section 113 will be described in more detail.

Figure 2:
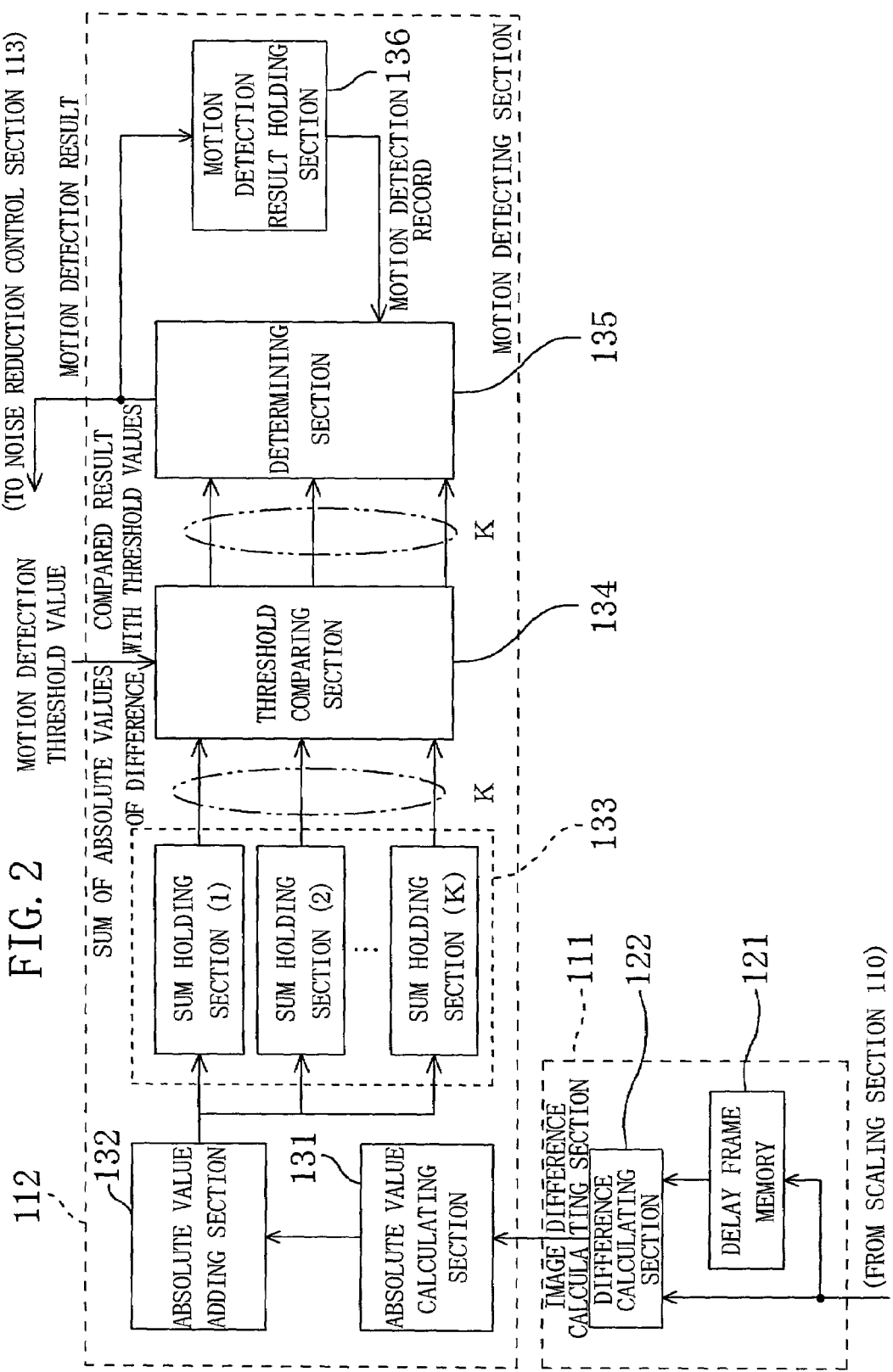
FIG. 2 is a block diagram specifically showing the structure of an inter-image difference calculating section 111 and a motion detecting section 112 according to the first embodiment.

For example, as shown in FIG. 2, the image difference calculating section 111 includes a delay frame memory 121 and a difference calculating section 122. The delay frame memory 121 holds image data output from the scaling section 110 and outputs that image data with a delay of one field or one frame period. The difference calculating section 122 calculates the difference between the image data output from the delay frame memory 121 and the image data output from the scaling section 110 on a pixel-by-pixel basis, that is, the difference between pixels of the same position in the respective image data.

As shown in FIG. 2, the motion detecting section 112 includes an absolute value calculating section 131, an absolute value adding section 132, a sum holding section 133, a threshold comparing section 134, a determining section 135, and a motion detection result holding section 136. The absolute value calculating section 131 calculates an absolute value of the difference output from the image difference calculating section 111. The absolute value adding section 132 adds absolute values of the differences of the pixels in at least a part of the image and outputs the sum of absolute values. The sum holding section 133 sequentially holds K sums of absolute values of differences (where K is a natural number such as 3 or 4). The threshold comparing section 134 compares each of the K sums of absolute values with a prescribed motion detection threshold value and outputs K comparison results. The determining section 135 outputs the motion detection result based on the K comparison results and the past motion detection record. The motion detection result holding section 136 holds the motion detection result, and outputs it to the determining section 135 as a motion detection record.

Figure 3:
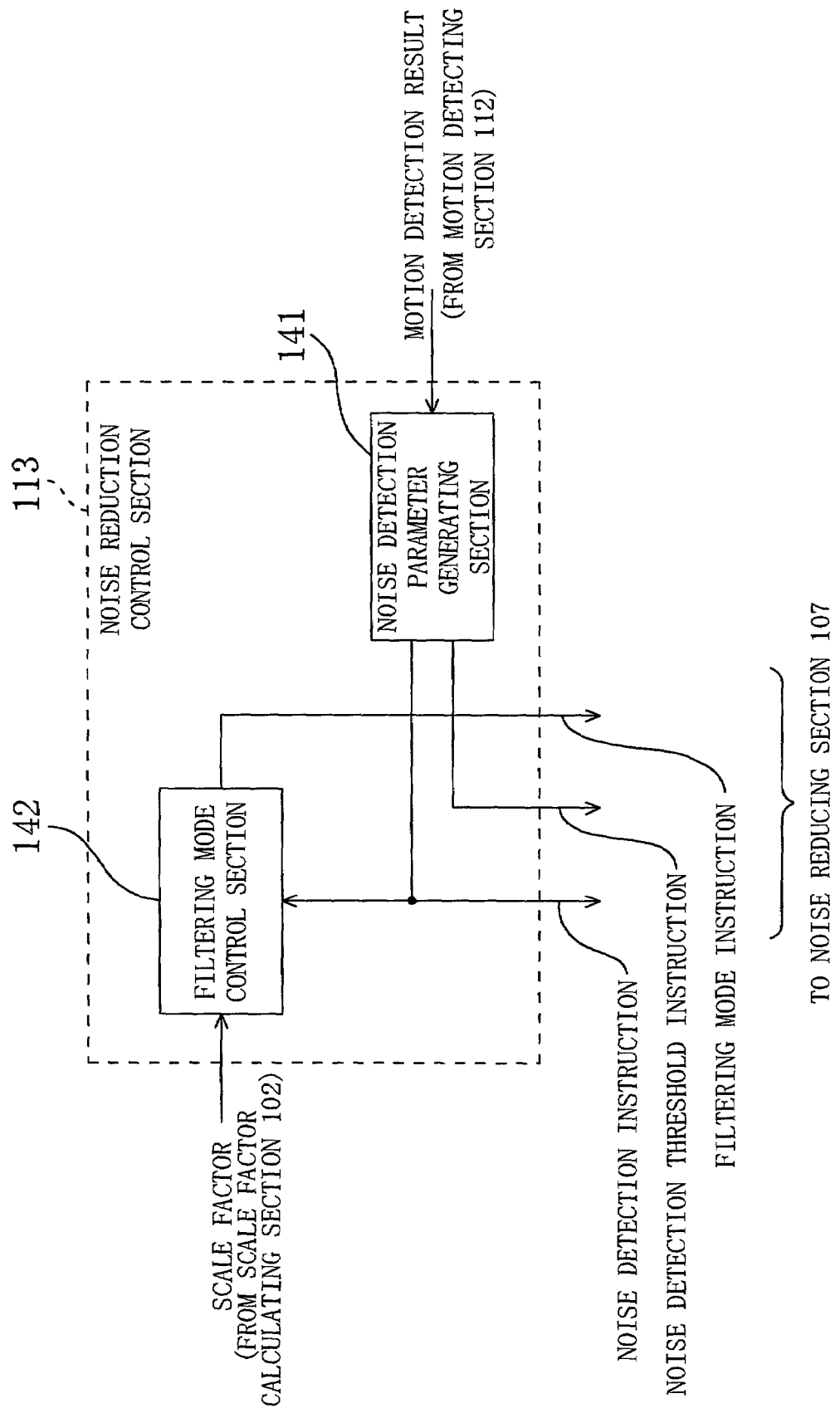
FIG. 3 is a block diagram specifically showing the structure of a noise reduction control section 113 according to the first embodiment.

As shown in FIG. 3, the noise reduction control section 113 includes a noise detection parameter generating section 141 and a filtering mode control section 142. The noise detection parameter generating section 141 outputs a noise detection instruction and a noise detection threshold instruction to the noise reducing section 107 based on the motion detection result output from the motion detecting section 112. The noise detection instruction indicates whether to cause the noise reducing section 107 to conduct noise detecting operation (and thus noise reducing operation) or not. The noise detection threshold instruction indicates noise detection sensitivity of the noise reducing section 107, that is, a threshold value for judging presence/absence of noise. The filtering mode control section 142 outputs a filtering mode instruction to the noise reducing section 107 according to the scale factor output from the scale factor calculating section 102 and the noise detection instruction. The filtering mode instruction designates one of preset combinations of the number of filter taps and a filter coefficient regarding a filter included in each of the mosquito noise reducing section 108 and the blocking artifact reducing section 109. The filtering mode instruction is thus used to control the noise reduction level.

Hereinafter, operation of the noise reducing apparatus thus structured will be described.

For image display based on stream data, the stream data is first applied to the stream analyzing section 101 and the decoder 103. The stream analyzing section 101 analyzes the input stream data, and outputs the original image size to the scale factor calculating section 102 as well as outputs a decoding parameter to the decoder 103.

The scale factor calculating section 102 calculates a scale factor of the image based on the original image size and an input or preset display image size, and outputs the calculation result to the noise reduction control section 113.

The noise reduction control section 113 outputs a noise detection instruction, a noise detection threshold instruction and a filtering mode instruction to the noise reducing section 107 based on the scale factor and the motion detection result output from the motion detecting section 112 as described in detail below. For example, when the motion detection result output from the motion detecting section 112 indicates "slow-moving image", the noise detection parameter generating section 141 of the noise reduction control section 113 makes the noise detection instruction "invalid" (in this case, the noise detection threshold instruction and the filtering mode instruction are not particularly specified). On the other hand, when the motion detection result indicates "fast-moving image", the noise detection parameter generating section 141 makes the noise detection instruction "valid", and outputs a noise detection threshold instruction for the fast-moving image. In response to the "valid" noise detection instruction, the filtering mode control section 142 outputs a filtering mode instruction based on the scale factor output from the scale factor calculating section 102. For example, when enlarging the image, the filtering mode control section 142 outputs a filtering mode instruction designating the number of filter taps and/or a filter coefficient corresponding to the noise reduction level that is lower than that at the scale factor of 1. For example, when enlarging the image, the filtering mode control section 142 outputs a filtering mode instruction designating the number of filter taps that is less than that at the scale factor of 1, and a filter coefficient corresponding to the number of filter taps.

The decoder 103 decodes the input stream data using the decoding parameter output from the stream analyzing section 101, and stores the decoded image data into the frame memory 104.

The image extracting section 105 extracts effective display image data for actual display from the image data read from the frame memory 104, based on pixel extraction position information, and outputs the effective display image data to the noise reducing section 107. For example, the pixel extraction position information indicates coordinates of the upper left pixel and the respective numbers of pixels in the vertical and horizontal directions in the image to be extracted. The in-block pixel position calculating section 106 calculates the position of each pixel in a corresponding encoding block based on the image extraction position information. The pixels whose position is calculated in the in-block pixel position calculating section 106 are those to be processed in the mosquito noise reducing section 108 and/or the blocking artifact reducing section 109 in the noise reducing section 107.

The mosquito noise reducing section 108 and the blocking artifact reducing section 109 in the noise reducing section 107 reduce noise from the image data extracted by the image extracting section 105, based on the positional information calculated by the in-block pixel position calculating section 106. Noise reduction characteristics in this noise reducing process are determined by the noise detection instruction, noise detection threshold instruction and filtering mode instruction that are output from the noise reduction control section 113 as described before.

More specifically, when the noise detection instruction is "invalid", noise detection will not be conducted. Therefore, the mosquito noise reducing section 108 and the blocking artifact reducing section 109 each outputs the input image data without conducting any noise reducing process. In this case, the mosquito noise reducing section 108 and the blocking artifact reducing section 109 may output the input image data as it is, or may process the input image data based on the number of filter taps and a filter coefficient such that the output image data is the same as the input image data. On the other hand, when the noise detection instruction is "valid", the mosquito noise reducing section 108 and the blocking artifact reducing section 109 operate as follows:

Regarding the image data output from the image extracting section 105, the mosquito noise reducing section 108 calculates the difference between adjacent pixels in each encoding block, and then compares the calculated difference with a threshold value indicated by the noise detection threshold instruction from the noise reduction control section 113. The mosquito noise reducing section 108 thus detects an edge region of the image at which mosquito noise is likely to be generated and a flat region around the edge region. Once detecting an edge region and a flat region, the mosquito noise reducing section 108 smoothes the image data of the flat region around the edge based on the number of filter taps and the filter coefficient indicated by the filtering mode instruction from the noise reduction control section 113. The mosquito noise reducing section 108 thus outputs the image data having mosquito noise reduced therefrom.

Regarding the image data output from the mosquito noise reducing section 108, the blocking artifact reducing section 109 calculates the difference between adjacent pixels at the boundary of each encoding block and its periphery, and then compares the calculated difference with a threshold value indicated by the noise detection threshold instruction from the noise reduction control section 113. The blocking artifact reducing section 109 thus detects a region where the pixels around the block boundary are flat in a respective encoding block. Regarding the detected flat region, if the difference between adjacent pixels across the block boundary is larger than that between adjacent pixels within each block, the blocking artifact reducing section 109 smoothes the image data around the block boundary based on the number of filter taps and the filter coefficient indicated by the filtering mode instruction from the noise reduction control section 113. The blocking artifact reducing section 109 thus outputs the image data having blocking artifact reduced therefrom.

The scaling section 110 scales the image data having noise reduced therefrom according to the scale factor output from the scale factor calculating section 102. When the scale factor is 1, the scaling section 110 may output the input image data without conducting any scaling process, or may scale the input image data by the scale factor of 1.

The image data thus scaled is output to, e.g., a not-shown display device as display image data. This image data is also output to the image difference calculating section 111, and motion detection is conducted in order to control the noise reduction characteristics of the noise reduction control section 113.

More specifically, the image data output from the scaling section 110 is first held in the delay frame memory 121 of the image difference calculating section 111. The delay frame memory 121 outputs the received image data with a delay of one frame (or one field) period. The difference calculating section 122 calculates the difference between the subsequent image data from the scaling section 110 and the delayed image data on a pixel-by-pixel basis. In other words, the difference calculating section 122 calculates the difference between pixels of the same position in the respective image data.

The absolute value calculating section 131 of the motion detecting section 112 then calculates an absolute value of the difference. The absolute value adding section 132 adds absolute values of the differences regarding the pixels in at least a part of the image, and outputs the sum of absolute values. The sum holding section 133 sequentially holds K sums of absolute values of the differences regarding K frames. The threshold comparing section 134 compares each of the K sums with a motion detection threshold value, and outputs K comparison results. The determining section 135 outputs the motion detection result based on each comparison result and the past motion detection record. More specifically, when every sum is greater than the motion detection threshold value, the determining section 135 determines the image as "fast-moving image". When every sum is smaller than the motion detection threshold value, the determining section 135 determines the image as "slow-moving image". When at least one of the sums is greater than the motion detection threshold value and the remainder is smaller than the motion detection threshold value, the determining section 135 makes the same determination as the past motion detection record held in the motion detection result holding section 136. More specifically, when the difference between frames is definitely larger or smaller than the motion detection threshold value over several previous frames, the determining section 135 determines the image as fast-moving or slow-moving image. However, if the difference between frames varies over several previous frames, the determining section 135 maintains previous determination results. Motion detection suitable for human eye's visual characteristics to the noise and image quality is thus conducted appropriately. The motion detection result thus obtained is held in the motion detection result holding section 136 for the following determination. This motion detection result is also applied to the noise detection parameter generating section 141 in the noise reduction control section 113, whereby the noise reduction characteristics are controlled according to the motion of the image as described before.

As has been described above, parameters such as an encoding noise detection threshold value and the number of filter taps and a filter coefficient of a smoothing filter are adaptively controlled according to the scale factor and the degree of motion of the image. This enables improved quality of the display image according to the display image size and the degree of motion of the image.

Note that the motion detection method is not limited to that described above, and various known detection methods may alternatively be used.

Although motion of the image is herein detected in two levels (i.e., fast and slow), the present invention is not limited to this. Motion of the image may be detected in several of levels so that the noise reduction characteristics are controlled in various levels.

Second Embodiment

Figure 4:
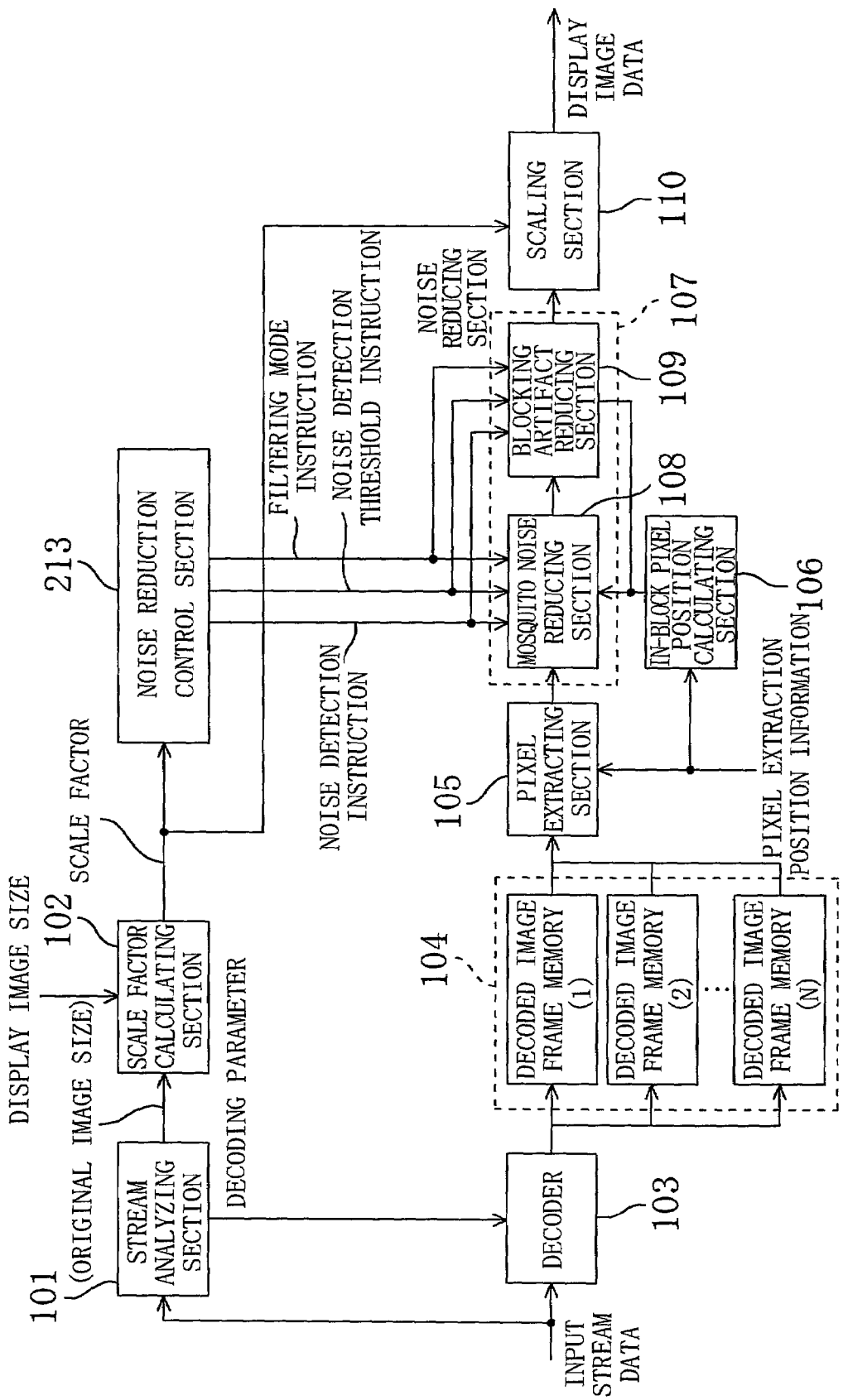
FIG. 4 is a block diagram showing the structure of a noise reducing apparatus according to a second embodiment of the present invention.

The first embodiment shows the example in which the noise reduction characteristics are controlled according to both the scale factor and the degree of motion of the image. However, the present invention is not limited to this. For example, as shown in FIG. 4 or 5, the noise reduction characteristics may be controlled according to either the scale factor or the degree of motion of the image. Note that, in the following embodiments, elements having the same function as that of the first embodiment are denoted with the same reference numerals, and description thereof is omitted.

For example, as shown in FIG. 4, the noise reduction control section 113 of the first embodiment may be replaced with a noise reduction control section 213 that outputs a noise detection instruction, a noise detection threshold instruction and a filtering mode instruction based only on the scale factor output from the scale factor calculating section 102. In this case, the image difference calculating section 111 and the motion detecting section 112 of the first embodiment may be reduced.

Alternatively, as shown in FIG. 5, the noise reduction control section 113 of the first embodiment may be replaced with a noise reduction control section 313 that output a noise detection instruction, a noise detection threshold instruction and a filtering mode instruction based only on the motion detection result output from the motion detecting section 112.

The noise reduction control section 213 of FIG. 4 may also output the noise detection instruction and the noise detection threshold instruction based on the scale factor as shown in the figure. Alternatively, like the filtering mode control section 142 of the first embodiment, the noise reduction control section 213 may output only the filtering mode instruction, and the noise detection instruction and the noise detection threshold instruction may be separately applied to the noise reducing section 107 from another device or the like, or may be set by the user. Similarly, the noise reduction control section 313 of FIG. 5 may also output the filtering mode instruction based on the motion detection result. Alternatively, the filtering mode instruction may be separately applied to the noise reducing section 107 from another device or the like.

Third Embodiment

As shown in FIG. 6, the noise reducing apparatus of the third embodiment includes a noise reduction control section 413 including a noise detection parameter generating section 441, instead of the noise reduction control section 113 including the noise detection parameter generating section 141 in the first embodiment. In response to a still-state notification signal, the noise detection parameter generating section 441 makes a noise detection instruction "valid" regardless of the motion detection result, and outputs a noise detection threshold instruction for the still state (Note that, when no still-state notification signal is applied (when the still-state information signal is "invalid"), the noise reduction control section 413 operates in the same manner as that of the noise reduction control section 113). The still state herein refers to the state in which the image data held in the frame memory is repeatedly read for display. More specifically, in the still state, there is no noise varying with time, but there may be noise within a frame. Therefore, it is preferable to reduce such noise. In the still state, completely the same image data are applied to the image difference calculating section 111. Therefore, the motion detecting section 112 determines that there is no motion in the image. Thus, outputting a noise detection instruction or the like in response to the still-state notification signal regardless of the motion detection result of the motion detecting section 112 enables high-quality image display even in the still state.

Fourth Embodiment

A noise reducing apparatus of the fourth embodiment is capable of reducing random noise as well without causing significant increase in circuit scale.

As shown in FIG. 7, this noise reducing apparatus includes a random noise reducing section 521 in addition to the structure of the first embodiment. The random noise reducing section 521 reduces random noise from the image data output from the scaling section 110. As in the first embodiment, regarding the image data output from the random noise reducing section 521, the image difference calculating section 111 calculates the difference between image data of successive fields or frames on a pixel-by-pixel basis (i.e., the difference between pixels of the same position in the respective image data). The random noise reducing section 521 includes a correction value calculating section 522 and a pixel data correcting section 523. The random noise reducing section 521 reduces random noise by utilizing the property that random noise is generated without correlation with time (i.e., each pixel data value varies with time). The correction value calculating section 522 calculates correction data based on the difference output from the image difference calculating section 111 so as to approximate each pixel data value to the median of the variation. The pixel data correcting section 523 corrects the image data output from the scaling section 110 by, e.g., adding or subtracting the correction data received from the correction value calculating section 522 to or from each pixel data. Note that, as described above, the image difference calculating section 111 herein obtains the difference of the image data output from the image data correcting section 523. However, the present invention is not limited to this. The image difference calculating section 111 may alternatively obtain the difference of the image data output from the scaling section 110 as in the first embodiment. The position of the image data correcting section 523 is not limited to that described above. For example, the image data correcting section 523 may alternatively be provided in an earlier stage than the scaling section 110.

As described above, the difference of image data required for motion detection of the image and the difference of image data required for random noise reduction are calculated by the common image difference calculating section 111. Therefore, encoding noise can be appropriately reduced or reduced according to the degree of motion of the image as well as random noise can be reduced or reduced while suppressing the circuit scale.

Note that, as in the second embodiment (FIG. 5), in the fourth embodiment as well, the noise reduction characteristics may be controlled by the noise detection instruction or the like based only on the motion detection result. As in the third embodiment (FIG. 6), encoding noise may be reduced with appropriate noise reduction characteristics even in the still state in response to the still-state notification signal.

Note that, in the above embodiments, the noise reduction control section 113 or the like applies a common noise detection instruction and the like to the mosquito noise reducing section 108 and the blocking artifact reducing section 109 in the noise reducing section 107. However, the present invention is not limited to this. Separate noise detection instructions and the like may be applied to the respective noise reducing sections.

Herein, the noise reducing process is not conducted when the noise detection instruction is "invalid". However, the present invention is not limited to this. The noise reducing process may be directly controlled by an instruction to conduct the noise reducing process. Alternatively, the noise detection threshold instruction and the filtering mode instruction may be used so that noise is not detected or so that the output image data is the same as the input image data.

Although the noise reduction characteristics are herein controlled by the noise detection threshold instruction and the filtering mode instruction, the present invention is not limited to this. The noise reduction characteristics may alternatively be controlled by directly designating the threshold, the number of filter taps and the like. In this case, the threshold value and the like may either be set in a stepwise manner or may be set to a continuous value.

Although the noise reducing apparatus herein scales the image by the scaling section 110, the present invention is not limited to this. The same effects can be obtained even when the image is either enlarged or reduced (including or not including the case of the scale factor of 1).

Although the scale factor calculating section 102 herein calculates the scale factor of the image, the present invention is not limited to this. The scale factor may alternatively be designated from the outside.

As has been described above, according to the present invention, the encoding-noise reduction characteristics are controlled according to the scale factor and the degree of motion of the image. Therefore, noise can be appropriately reduced even from the image scaled by various factors or the fast-moving or slow-moving image. Moreover, degradation in image quality resulting from noise reduction can be suppressed to a negligible level. Further, not only encoding noise but also random noise can be reduced or reduced while suppressing the circuit scale.

What is claimed is:

1. A noise reducing apparatus, comprising:
at least one noise reducing section for reducing encoding noise of image data with controllable noise reduction characteristics;
a control section for controlling the noise reduction characteristics of the noise reducing section according to at least one of a scale factor for scaling an image represented by the image data and a degree of motion of the image;
a motion detecting section for obtaining the degree of motion of the image based on a sum of absolute values of differences between pixel data of pixels of the same position in at least one pair of successive field images or frame images, the difference being obtained for pixels in at least a part of each field image or each frame image, wherein the control section controls the noise reduction characteristics of the noise reducing section according to output of the motion detecting section;

a random noise reducing section for reducing random noise of the image data using a difference between pixel data of pixels of the same position in at least one pair of successive field images or frame images; and a difference calculating section shared for calculating the difference between pixel data for reducing the random noise by the random noise reducing section and for calculating the difference between pixel data for obtaining the degree of motion of the image by the motion detecting section.

2. The noise reducing apparatus according to claim 1, wherein the motion detecting section obtains the degree of motion of the image based on a comparison result of each of the sums absolute values of differences in at least one pair of successive images with at least one prescribed threshold value.

3. A noise reducing apparatus, comprising:

at least one noise reducing section for reducing encoding noise of image data with controllable noise reduction characteristics;

a control section for controlling the noise reduction characteristics of the noise reducing section according to at least one of a scale factor for scaling an image represented by the image data and a degree of motion of the image; and a motion detecting section for obtaining the degree of motion of the image based on a plurality of sums of absolute values of differences between pixel data of pixels of the same position in a plurality of pairs of successive field images or frame images, the difference being obtained for pixels in at least a part of each field image or each frame image, wherein the control section controls the noise reduction characteristics of the noise reducing section according to output of the motion detecting section, wherein the motion detecting section obtains the degree of motion of the image based on the plurality of sums respectively obtained for the plurality of image pairs.

4. The noise reducing apparatus according to claim 3, wherein the motion detecting section obtains the degree of motion of the image based on a comparison result of each of the sums of absolute values of differences in at least one pair of successive images with at least one prescribed threshold value.

* * * * *